July 21, 1970     W. W. BUECHNER     3,521,545
PHOTOGRAPHIC VESSEL
Filed Oct. 23, 1967
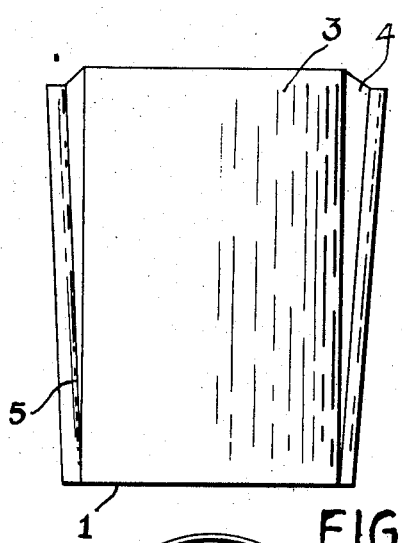
FIG. 1
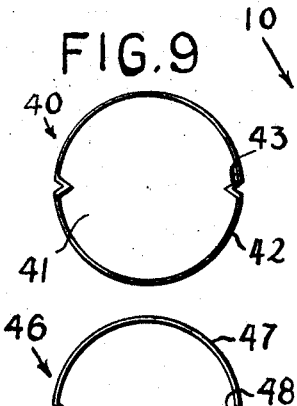
FIG. 9
FIG. 10
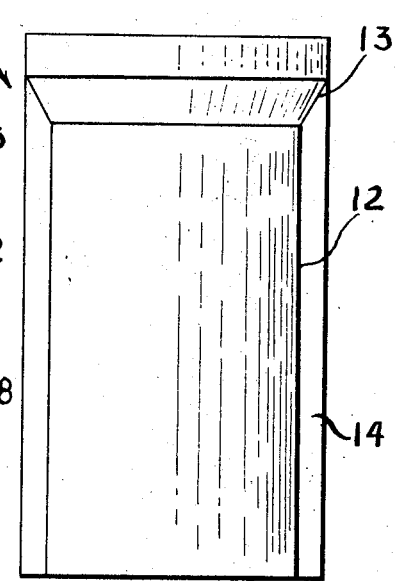
FIG. 3
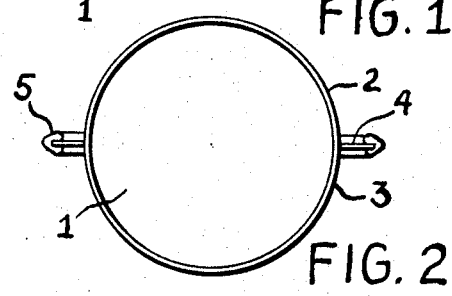
FIG. 2
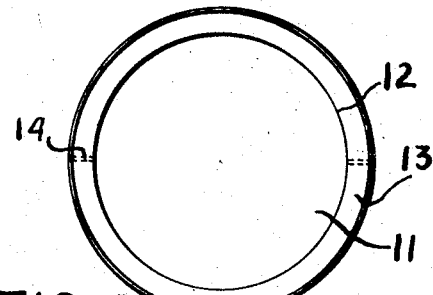
FIG. 4
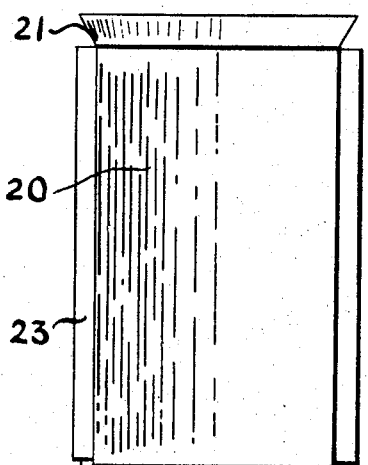
FIG. 5
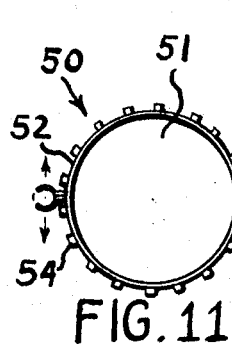
FIG. 11
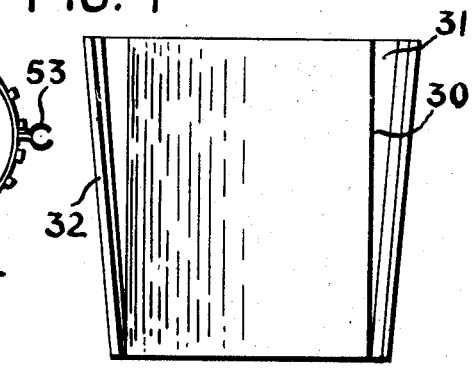
FIG. 7
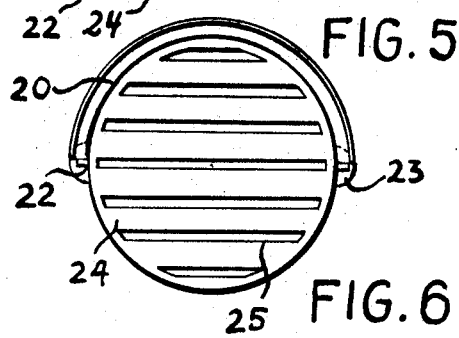
FIG. 6
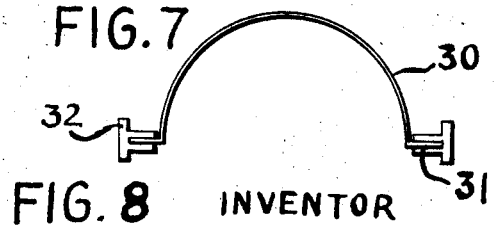
FIG. 8
INVENTOR
Werner W. Buechner

United States Patent Office 3,521,545
Patented July 21, 1970

3,521,545
PHOTOGRAPHIC VESSEL
Werner W. Buechner, 4407 Gladding Court,
Midland, Mich. 48640
Continuation-in-part of applications Ser. No. 342,198,
Feb. 3, 1964, Ser. No. 342,459, Feb. 4, 1964, and Ser.
No. 632,842, Jan. 23, 1967. This application Oct.
23, 1967, Ser. No. 677,130
Int. Cl. G03d 1/04
U.S. Cl. 95—96                                                13 Claims

ABSTRACT OF THE DISCLOSURE

A photographic treating vessel having a half or full cylindrical wall portion, a circular opening in the top portion of the wall, a bottom portion, and vertical sealing elements on opposite sides of the cylindrical wall parallel to the axis of the cylinder. The vessel is inserted into a treating compartment of a developing apparatus such that a passageway is formed between the bottom of the vessel and the compartment. The sealing elements cooperate with juxtaposed parts in the compartment so that a stream of water flowing through the compartment will flow in a vertical direction along the entire cross section of one side of the cylindrical wall, beneath the lower passageway formed by the vessel and the compartment, and subsequently along the cross section of the other side of the cylindrical wall.

---

The present invention relates to vessels for the wet treatment of photographic material, and more particularly to photographic treating vessels for the reception of photographic chemical solutions and to washing vessels for the washing of photographic materials, especially of color materials in a stream of essentially vertically flowing wash water.

This application is a continuation-in-part of my copending application Ser. No. 342,459, now Pat. No. 3,349,686, filed Feb. 4, 1964, and entitled, "Photographic Process and Apparatus," and of my copending application Ser. No. 342,198, now Pat. No. 3,362,315, filed Feb. 3, 1964, and entitled, "Photographic Treating Vessel," and of my copending application Ser. No. 632,842, now Pat. No. 3,470,810, filed Jan. 23, 1967, and entitled, "Water Jacket and Photographic Processing Apparatus."

In my applications Ser. No. 342,459 and Ser. No. 632,-842 is described new apparatus for the sequential multi-step wet treatment of photographic materials and especially for the development of photographic color materials while in a cylindrical or convoluted configuration. The wet treating steps comprise chemical steps in chemical treating solution and/or rinsing or washing steps as the case may be. The chemical treating solutions are contained in upright treating vessels which are inserted in a compartmented water jacket of the apparatus with seal or partial seal such that a stream of water passed through the apparatus and flowing in essentially vertical direction serves sequentially as the means for controlling the temperature of the various treating solutions within the limits required by the process to be carried out. By the use of specially designed washing vessels or other suitable means, which are likewise inserted in compartments of said compartmented water jacket with seal or partial seal, the said flowing stream of water may serve also as the washing or rinsing medium while it is formed into an essentially vertically flowing column.

It is an object of the present invention to provide new, improved upright cylindrical treating vessels for use in apparatus of the just described kind and in similar apparatus, which vessels permit a more efficient and accurate temperature control in the chemical treating solutions.

It is another object of the invention to provide new improved upright treating vessels which can be readily manufactured at low cost and which can be exchangeably and removably inserted in compartments of said water jacket with the provision of instant seal of a kind required to set up the desired essentially vertical flow pattern or a vertical or horizontal zigzag flow pattern as may be desired.

It is a further object of the invention to provide new improved cylindrical wash vessels, which provide an extremely efficient washing action, when inserted in a compartment of a compartmented water jacket.

It is still another object of the invention to provide new wash vessels, which can be exchangeably and removably inserted into compartments of a compartmented water jacket, with seal, so as to convert the compartment wherein it is contained into a washing location of essentially vertically flowing wash water.

Other objects will become apparent from the attached drawings and from the flowing description of the invention.

The objects are achieved by upright, cylindrical photographic vessels which comprise at opposite portions of the cylindrical wall sealing means which are oriented essentially parallel to the cylinder axis of the vessel and which extend preferably essentially over the whole length of the cylindrical wall.

DRAWINGS

In the attached schematic drawings, FIG. 1 is a side elevation and FIG. 2 a top elevation of a basic embodiment of the treating vessel of the invention comprising male sealing means.

FIG. 3 is a side elevation and FIG. 4 a top elevation of another embodiment of the treating vessel of the invention comprising likewise male sealing means.

FIG. 5 is a side elevation and FIG. 6 a top elevation of an embodiment of the wash vessel of the invention comprising a half-cylindrical wall and male sealing means. FIG. 7 is a side elevation and FIG. 8 a top elevation of another embodiment of the wash vessel of the invention comprising slanted male sealing means.

FIG. 9 is a schematic top elevation of a treating vessel comprising female sealing means and FIG. 10 is a schematic top elevation of a wash vessel comprising identical female sealing means.

FIG. 11 is a schematic top elevation of a treating vessel comprising a different kind of male sealing means.

The treating vessels of the present invention are characterized by a bottom and a full cylindrical wall, which wall may be composed of two half cylindrical sections or which may be made in one piece as a full cylinder.

Referring to FIGS. 1 and 2, the treating vessel comprises circular horizontal bottom 1 and a cylindrical wall composed of the two half cylindrical sections 2 and 3. The cylinder axis of the vessel is oriented in operating position essentially horizontally. At opposite portions of the cylinder wall, where the two half cylindrical sections 2 and 3 meet, are provided ribs 4, joined to and projecting outwardly from the cylindrical wall of the vessel and extending from top to bottom of the cylinder wall. The outer free edge of rib 4 is slanted inwardly from top to bottom and profiled seal strip 5, having a heart-shaped horizontal cross section is slipped over the outer portion of rib 4, so as to form the essentially vertical sealing means of the vessel, which serve also as the means for localizing the vessel in the compartment and supporting it is a centered position as may be desired.

The vessel is advantageously used in a compartment of a compartmented bath which has essentially cylindrical compartments of a diameter slightly larger than that of the vessel, with cooperating groove-like counter-sealing means provided in the cylindrical wall of the compartment at appropriate positions. For the operation of the vessel, the vessel is inserted into the compartment, such that the sealing means slideably engage into the groove-like counter sealing means and the vessel is slipped down nearly to the bottom of the compartment. In this manner a narrow half cylindrical passageway is formed on each side of the vessel, separated by the rib-like sealing means and connected by the narrow horizontal passageway underneath the bottom of the vessel, so that water, flowing in on one side of the compartment flows downwardly in form of a narrow, widespread stream along one of the half cylindrical sections of the vessel, underflows the bottom and flows upwardly along the opposite half cylindrical sections of the wall of the vessel. It need not be mentioned that the cylinder wall and the sealing means of the vessel, when it is inserted in the compartment, must extend to a level at least slightly higher than the cylinder wall of the compartment and to a height above the water level in the compartment, so as to prevent the water that flows into the vessel or bypasses the vessel, instead of being forced to take the said essentially vertical up-and-down path, which provides, as is readily apparent, the highest possible heat exchange between the flowing water and the chemical solution contained in the treating vessel due to its being spread out to a very narrow, thin stream and due to its taking the long vertical flow path around the vessel including its bottom. The effectiveness of heat exchange achieved by the use of the treating vessel of the present invention far surpasses that which is possible in any of the conventional equipment of this type. By using a stream of water which has a temperature approximately equal to the temperature to be maintained in the chemical treating solution, it is possible to bring the temperature in the chemical solution to the desired level in a very short time and to maintain it there for indefinite periods without the need for any further controls.

The effectiveness of the temperature control is so great, that it is possible to use for the construction of the vessel also materials, which are, because of their poor heat transfer properties normally not considered suitable for this purpose, such as plastics, e.g., polystyrene, polyethylene, polypropylene, etc, or plastic-coated cardboard and the like. Alternatively, the vessel may be made from any desired conventional construction material, such as metals, like corrosion resistant stainless steel, etc., or from glass, porcelain, enameled steel and the like materials customarily used for the construction of photographic treating tanks or trays.

To insure the maintenance of passageways of equal widths all around the cylinder wall, particularly when the vessel is made of thin flexible materials, such as plastics, it is of great benefit, if the vessel and/or the compartment are provided at their respective cylindrical walls with spacers, preferably triangular longitudinal spacers, which extend essentially parallel to the cylinder axis, so that the respective cylinder wall and spacers actually contact by the apex of the spacers, leaving in between a plurality of vertical channels for the vertical flow and passage of the water by the cylindrical half section of the vessel. Suitable spacers and their positions are described in my copending application Ser. No. 632,842 to which special reference is made herewith.

In order to assure the maintenance of the required passageway below the bottom of the vessel, suitable spacers may be provided at the bottom, at the lower edge of the cylinder wall and/or at the bottom of the sealing means in form of a small downward extension of the sealing means and/or the spacers may suitably provided in said compartments of the water jacket, either at the bottom thereof or by slight shortening of the counter sealing means in the compartment, so as to terminate them at a position slightly above the bottom of the compartment.

When the vessel is made, for reasons of economy and maximum heat exchange, from very thin flexible material, it is desired to keep the compression forces, acting along the connecting lien between the two sealing means, as low as possible to keep the deformation of the vessel at a minimum. This can be readily achieved by the use of sealing means wherein the required seal is primarily achieved by forces acting across the seal. This situation is ideally achieved in the triangular or heart-shaped sealing means as shown in FIGS. 1 and 2, if they are used in a compartment having suitably shaped and dimensioned cooperating V-groove-like counter sealing means. Other form of sealing means may be used with equal benefit, such as those shown for instance in FIGS. 5 to 11 of the present application. T-shaped, I-shaped or other sealing means, comprising a radial flange portion and two tangential rib portions, which actually provide the seal, may also be used.

The slant of the outer free edge of the sealing means makes for easy insertion and removal of the treating vessel in a compartment in which the counter sealing means have a like slant, providing at the same time the best possible seal at the least amount of transversal tension across the vessel. Alternatively, the sealing means itself may have slanted sides, forming a wedge, which takes up all the forces required for tight seal. The sealing means have been shown to be provided symmetrically, dividing the upright cylinder wall into two identical half cylinders. For special purposes, it may be desirable, to provide the sealing means unsymmetrically, so as to provide a smaller and a larger partial cylindrical section between them.

The vessel has been shown herein and described as a full cylinder. If desired, the vessel of the invention, having like basic structure, may also be designed as forming an upright cylinder annulus. This structure may be simply achieved by providing in the vessel concentrically a core, or more advantageously it may be achieved by providing inside the cylindrical wall, located concentrically, a second cylindrical wall of smaller diameter with the bottom section of the vessel being limited to the outer annular portion between the two walls, whereby the inner cylindrical core section is open at the bottom. This latter type of vessel is advantageously used in a bath which comprises a suitably dimensioned and shaped concentrical core, filling out the inner, free section of the vessel, when it is inserted in the compartment. With this type of vessel, and compartment, the temperature controlling efficiency may be further increased by designing the core such, that narrow passageways are also left between the core and the inner, smaller cylindrical wall, which wall is preferably also provided with a second pair of opposite sealing means which provide seal against the core, e.g., by providing in the core a second pair of groove-like counter sealing means. In this manner a double up-and-down path is established, so that heat exchange is effected at the outer large cylinder wall and also at the inner smaller cylinder wall of the vessel. This type of vessel is preferably used for the treatment of photographic materials which are in form of a hollow cylinder such as a cylindrical sheet or a film wound spirally on a cylindrical support. Examples of annular vessels are described and illustrated in my copending application Ser. No. 342,197, now Pat. No. 3,337,714, to which special reference is made as to the general form thereof.

The standard cylindrical vessel of the kind exemplified in FIGS. 1 and 2 of the present application is primarily useful for the development of concentrically wound spirals or reels of band of film and especially of color film wound in conventional manner on the conventional film reels. A suitable film carrier, which may be used with these reels, is disclosed, for instance, in my copending application Ser. No. 342,459 and in French Pat. No. 1,492,766.

Another preferred embodiment of the upright cylindrical vessel of the invention is illustrated in FIGS. 3 and 4.

The vessel designated generally at 10 comprises bottom 11 and full cylindrical wall 12 which slants outwardly at the top end to form circular trough-like reservoir 13 for the retention of excess chemical treating solution and/or for the facilitation of ready insertion of reels or other carriers for photographic film or sheet having a diameter close to the inner diameter of the vessel. At opposite sides of the cylindrical wall 12 are joined ribs 14 as the essentially vertical sealing means, extending from the bottom end of the vessel to the slanted wall portion of reservoir 13, to which they are likewise joined. Ribs 14 may be used as the sealing means as such or they may be provided with suitable profiled seal strips, preferably of an elastomeric material as described hereinbefore, with the triangular or heart-shaped cross sections preferred.

The term "upright" is used herein to distinguish the vessel from the flat trays of relatively low height as compared with their bottom area. The term is intended to denote, that the vessels, and the chemical solutions contained therein, stand to an appreciable height as compared with the bottom area. The vessels may be truly cylindrical, however, the term "cylindrical" is also intended to encompass forms, which are derived therefrom, e.g., those having a slightly elliptic form and those representing a truncated cone having moderate slant oft he circular wall, usually flaring upwardly. For the meaning of the additional terms used herein, special reference is made to my copending applications Ser. No. 342,459 and Ser. No. 350,612, now Pat. No. 3,349,689.

The vessels may comprise, instead of the specific sealing means, disclosed herein, any other sutiable kind of sealing means, provided, they fulfill the desired function of establishing, at about opposite places of the cylindrical wall, essentially water-tight seal between the cylinder wall of the vessel and the cylinder wall of the compartment, wherein it is contained, leaving open a passageway beneath the bottom of the vessel and permitting ready insertion and removal of the vessel. The sealing means may be provided symmetrically, or if desired unsymmetrically as long as they are at opposite sides of the vessel. The term "treating vessel" is used to designate any type of receptacle useful for the retention of chemical treating solutions, meeting the above given definitions.

The wash vessel of the present invention is characterized by a half-cylindrical wall which is oriented, in operating position with its cylinder axis in essentially vertical position.

Referring to FIGS. 5 and 6, the preferred basic form of the wash vessel comprises a half-cylindrical wall 20 with its uppermost portion 21 slanting outwardly to form a half-circular widened trough-portion. Slanting wall section 21 serves to facilitate the insertion of reels or other carriers into the wash vessel, guiding them down into the central portion. To the vertical ends of half-cylindrical wall 20 are joined ribs 22 extending radially outwardly and extending from the top of the cylindrical wall, except for the slanted section 21, to the botom thereof. Over ribs 22 are slipped profiled seal strips 23, having approximately a half circular horizontal cross section and forming together with ribs 22 the vertical sealing means. The outer free edges of the sealing means have been illustrated to be truly vertically. They may however also be slanted and further modified as explained hereinbefore with respect to the treating vessel. To the half-circular bottom edge of the cylindrical wall 20 is joined horizontal, circular bottom 24 with slot-like apertures 25, provided therein for the passage of the wash water.

The wash vessel is, for its use, inserted into a cylindrical compartment of a compartmented water jacket, which preferably comprises counter sealing means cooperative with the sealing means of the wash vessel for essentially water tight seal between the vertical edges of the half-cylindrical wall and the corresponding portions of the cylindrical wall, similarly as described hereinbefore with respect to the treating vessels, so that a narrow, half-annular vertical passageway is formed between the half-cylindrical wall of the wash vessel and the portion of the wall of the compartment opposite thereto, with a lower passageway formed below the bottom of the wash vessel by inserting it to a level slightly above the bottom of the compartment. Of course, the dimensions of the vessel are such that the top portion of the cylindrical wall of the wash vessel and of the sealing means extends to a height above the overflow passage between neighboring compartments in the water jacket.

When inserted in this manner, the half-cylindrical wall of the wash vessel forms, together with the complementary half-cylindrical wall of the compartment a fully cylindrical washing location. Water flowing into the compartment, e.g., at the top of the said narrow vertical passageway, spreads out to a thin, wide stream, flowing downwardly in said passageway and flowing under the bottom of the wash vessel, where it flows through slots 25 upwardly to pass upwardly at an essentially uniform flow rate distributed over the entire cross section of the vessel or washing location respectively, which it leaves over the wide outlet overflow passage of the compartmented water jacket.

The purpose of the slot-like apertures 25 is, to achieve a uniform flow of the water over the circular cross section of the washing location or wash vessel, respectively. The size of the apertures in relation to the total cross section is adjusted in accordance with the absolute and relative intended flow rate of the wash water, with which the vessel is to be operated, wide slots being used at the higher flow rates and narrower slots being used at low flow rates as they are generally preferred in color processes for the preservation of hot water. Instead of using longitudinal slots as illustrated, the botom may be provided with one central or, preferably a plurality of smaller apertures of any desired shape and arranged in any desired manner for best distribution of the flowing water over the whole cross-section of the vessel. The water may also be passed through the vessel in a direction opposite to that just described, though the former manner is generally preferred.

The perforations in the bottom may have any other form and location and arrangement as may be desired for best distribution of the flowing water over the whole cross section of the cylindrical washing location. For highest effectiveness of the perforated bottom, the annular space between the bottom and the cylinder wall of the compartment should be as narrow as possible.

Any of the other sealing means exemplified herein, especially also with the treating vessels, may be substituted for those shown and any of the other variations and modifications explained in connection with the treating vessel may also be made in the wash vessel.

The wash vessel is preferably used in combination with the treating vessels in a given processing apparatus, advantageously successively arranged in successive compartments of the compartmented water jacket to stimulate a given color process to be carried out, e.g., generally treating vessels and wash vessels are alternating in the order required by the process. The wash vessel may, however, also be used exclusively in a given water jacket, e.g., for setting up an apparatus for multistep washing of material in successive washing steps.

The operation of the treating vessel and wash vessel of the invention has been described hereinbefore by way of example, in connection with cylindrical working compartments. The vessel is also suited to be used in compartments having any other desired regular or irregular form, such as rectangular or polygonal forms. In this case, the perforated bottom of the wash vessel has preferably a shape similar to the cross section of the compartment. Normally, it is desired that the working compartments, wherein the vessels are to be used, comprise suitably dimensioned and positioned counter sealing means. However, with certain forms of the sealing means of the vessels and of the compartments, they may also be used in compartments, which do not comprise counter sealing means.

Another embodiment of the wash vessel of the invention, which does not comprise the apertured bottom, is illustrated in FIGS. 7 and 8. The vessel comprises half-cylindrical wall 30, with its vertical ends angled at 90° to the tangent of the vertical ends of the cylindrical wall, so as to form vertical ribs 31, the outer free edge of which is slanted inwardly from top to bottom as described hereinbefore. Over the ribs 31 are contained slanted profiled seal strips 32, which have a T-like cross section so as to form at each side of the sealing means formed by them, a rib-like protrusion which engages in correspondingly shaped grooves in the compartment of the water jacket. This type of sealing means provides readily water-tight seal without setting up or requiring any forces across the wash or treating vessel, at which they are contained. All of the forces required for tight seal act within and across each of the sealing means separately and individually.

The wash vessel may be made from materials similar to those described for the treating vessel. The half-cylindrical wall may be modified as described in connection with the treating vessel to form, e.g., a half-elliptical or a half of a truncated conical receptacle. Any of the other sealing means described herein may be substituted. For ready exchangeability, the major dimensions of the wash vessel and the kind, dimensions and location of the sealing means are preferably identical or at least similar to those of the treating vessels with which they are to be used. The vertical wall of the wash vessel need not necessarily be exactly a half-cylinder. It can be somewhat more or less as may be required and as is illustrated, e.g., in FIG. 10. In exceptional cases, it may be as little as one-quarter or as much as three-quarters of a full cylinder wall.

A treating vessel having female sealing means is illustrated in FIG. 9 and a washing vessel having identical female sealing means is illustrated in FIG. 10. The treating vessel 40 comprises bottom 41 and essentially cylindrical wall 42 with essentially vertical V-grooves 43 extending over the full height of the cylindrical wall 42, including the bottom 41, so that the vessel can be inserted by its female, groove-like sealing means over cooperating male sealing means provided in appropriate positions of the compartment of the compartmented bath. By simply sliding down the vessel in the compartment, with the male and female sealing means engaged, to achieve essentially liquid-tight seal between the opposite parts of the cylindrical walls of the vessel and the correspondingly located portions of the compartment. As before, the vessel is thereby placed with its bottom slightly above the bottom of the compartment, so as to provide the required lower passageway.

The wash vessel 46, which may be exchangeably used in compartments of a compartmented bath comprising suitable male sealing means, comprises approximately half-cylindrical wall 47, with essentially vertical V-shaped grooves 48, extending along the vertical edges of the said half-cylindrical wall 47. V-grooves 48 are dimensioned and positioned to match those of the corresponding treating vessel.

The female sealing means, exemplified by the preferred V-grooves may have any other desired shape and cross section, as long as they permit ready insertion and removal of the vessels into and from the corresponding compartment. Round, oval, T-shaped, L-shaped or other horizontal cross sections may likewise be used.

Another embodiment of the male sealing means is exemplified in FIG. 11. Treating vessel 50 comprises bottom 51, cylindrical wall 52 formed by the joining of two half-cylindrical sections at the opposite places, where sealing means 53 are joined. Sealing means 53 comprise a rib-like protrusion protruding outwardly from the cylindrical wall, separating toward its free edge and forming rounded, elastic outer portions extending from top to bottom which, by slight compression in the direction of the arrows, provide, when inserted in suitable curved or V-shaped female sealing means in a compartment, the required essentially water-tight seal, assuring at the same time ready removability and exchangeability of the vessel.

Around the outer periphery of the cylindrical wall are shown essentially vertical spacers 54, which assure the proper spacing of the cylindrical wall of the vessel from the cylindrical wall of the compartment with the provision of a vertical passageway for the water on each side of the sealing means of the optimum width or thickness, respectively. Spacers of this type and their function are described in various forms in my copending application Ser. No. 632,842, to which special reference is made herewith. Any of the other forms of the treating vessels of the invention may be provided with the spacers, or correspondingly shaped spacers, preferably triangular cross section spacers may be provided appropriately in the cylindrical working compartments, as taught in my copending application Ser. No. 632,842.

A wash vessel, having sealing means as shown at 53 in FIG. 11 and a half-cylindrical wall, and if desired spacers and apertured bottom, etc., may be correspondingly constructed and dimensioned, so as to be exchangeable with the treating vessel. The treating vessels and, if desired, also the wash vessel may be constructed from very thin plastics or plastic coated cardboard materials. Using materials of, e.g., $1/60$–$1/100$ inch thickness, permits to manufacture the vessels so inexpensively that they may be discarded after one use, saving the chore of cleaning them. The use of the spacers, tangentially acting sealing means, etc., prevents undesirable deformation of the thin vessels, yet providing the desired instant perfect seal.

The terms "cylindrical" and "half-cylindrical" are used herein and in the claims broadly to encompass not only the truly cylindrical forms but also the forms derived therefrom, such as truncated conical and slightly elliptical forms as described hereinbefore, and curved walls being more or less than exactly a half of a full cylinder wall.

I claim:

1. A photographic vessel for the wet treatment of photographic materials, while the vessel is inserted in a compartment having opposite major side walls and wide water inlet and outlet passages at the top of said major side walls, said vessel comprising at least one half cylindrical wall, having a height greater than that of the major side walls of said compartment and having an essentially vertical cylinder axis, said vessel comprising furthermore a pair of essentially vertical sealing means provided outside of the vessel, essentially parallel to the said cylinder axis, at the opposite vertical edges of said half cylindrical wall for external sealing with the cooperating juxtaposed parts of said compartment, such that a stream of water passing through the compartment, while said vessel is inserted therein, with a lower passageway formed beneath the vessel, circumflows said half cylindrical wall in an essentially vertical direction along said cylindrical walls of the vessel and passes through said lower passageway.

2. The vessel of claim 1, wherein the sealing means are a pair of female sealing means.

3. The vessel of claim 2, wherein the sealing means are essentially vertical grooves opening toward the outside of the vessel.

4. The vessel of calim 1, wherein the sealing means are a pair of male sealing means.

5. The vessel of claim 4, wherein the sealing means are essentially vertical ribs, projecting outwardly from the vessel.

6. The vessel of calim 5, wherein the ribs are provided with a profiled seal strip of an elastomeric material.

7. The vessel of claim 1, which comprises a full cylindrical wall and a bottom, forming a closed upright, fully cylindrical vessel with a circular opening at the top, for the reception of chemical treating solutions, in which the sealing means are provided at opposite locations, essentially vertically along the outside of the cylindrical vessel.

8. The vessel of claim 7, which comprises superimposed at the open top end a widened, circular trough-like reservoir.

9. The vessel of claim 1, which comprises essentially vertical spacers, closely spaced all around the convex side of the cylinder wall.

10. The vessel of claim 1, which comprises one half-cylindrical wall, with sealing means comprised along the vertical edges of said half-cylindrical wall, so as to form an upright wash vessel, which converts a compartment in a compartmented water jacket into a washing location of essentially vertically flowing wash water.

11. The vessel of claim 10, which comprises in addition a full circular bottom, comprising a pattern of a plurality of apertures distributed over the bottom area.

12. A photographic vessel for washing photographic materials, which vessel comprises an essentially vertical cylinder axis, a half cylindrical wall, a circular opening in the top, and provided at the vertical edges of said half cylindrical wall a pair of essentially vertical external sealing means extending essentially over the full height of said half-cylindrical wall, said vessel comprising furthermore a full circular bottom which is apertured for the essentially uniform passage of an essentially vertical stream of water therethrough and essentially uniformly flowing over the whole cross section of the vessel outlined by the said circular bottom.

13. A photographic vessel for washing photographic materials, which vessel comprises an essentially vertical cylinder axis, a half-cylindrical wall, a circular opening in the top and provided at the vertical edges of said half-cylindrical wall a pair of essentially vertical external sealing means extending essentially over the full height of said half-cylindrical wall, and at least one opening at the bottom end and in the bottom area for the passage of water over essentially the full circular cross section outlined by said half-cylindrical wall, wherein the top portion of said half cylindrical wall is slanted outwardly for the facilitation of the insertion of a reel of film into the wash vessel.

References Cited
UNITED STATES PATENTS

| | | | |
|---|---|---|---|
| 773,945 | 11/1904 | Kronauer | 220—75 |
| 1,050,660 | 1/1913 | Johnson | 220—75 |
| 920,263 | 5/1909 | Burton | 95—90.5 |
| 1,194,321 | 8/1916 | Randall | 95—98 |
| 1,616,625 | 2/1927 | Howell | 220—5 |
| 2,212,357 | 8/1940 | Vanderwalker | 95—90.5 |
| 2,829,575 | 4/1958 | Collins | 95—96 XR |
| 2,829,576 | 4/1958 | Debrie | 95—96 |
| 2,912,915 | 11/1959 | Hiserman | 95—97 XR |

NORTON ANSHER, Primary Examiner

F. L. BRAUN, Assistant Examiner

U.S. Cl. X.R.

220—5